(No Model.) 5 Sheets—Sheet 3.

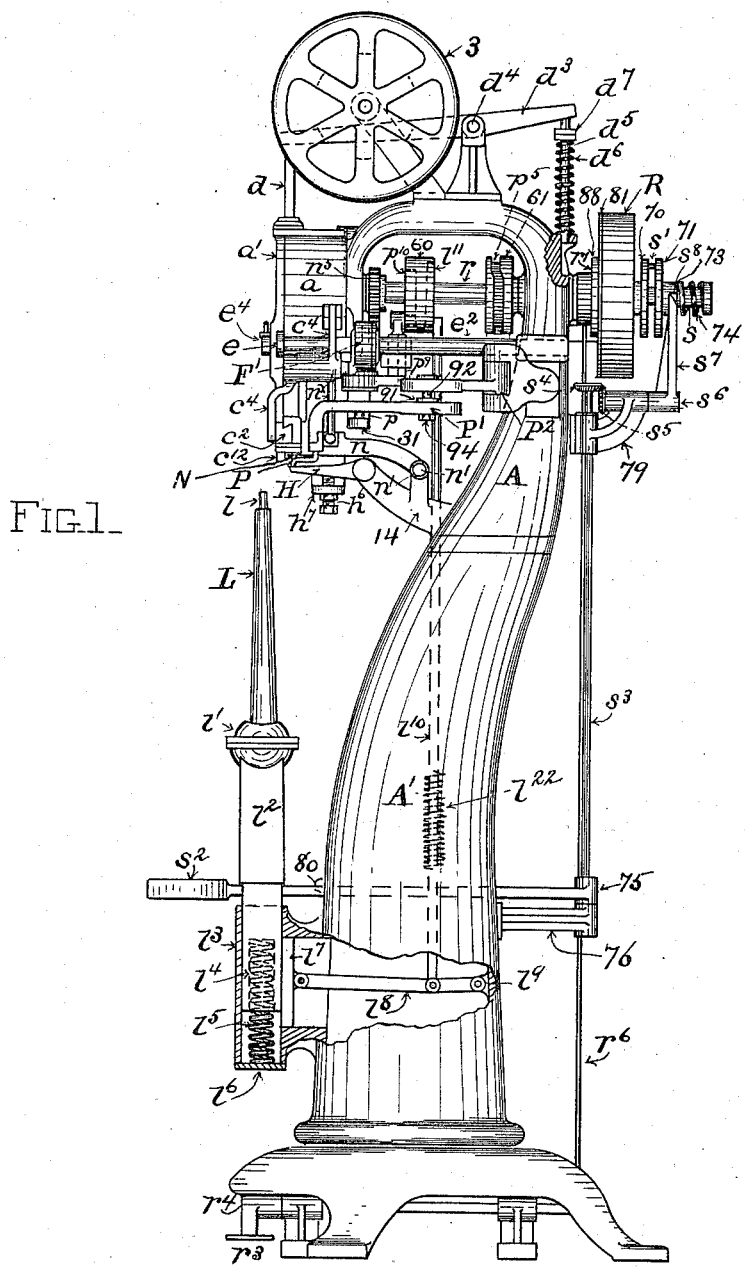

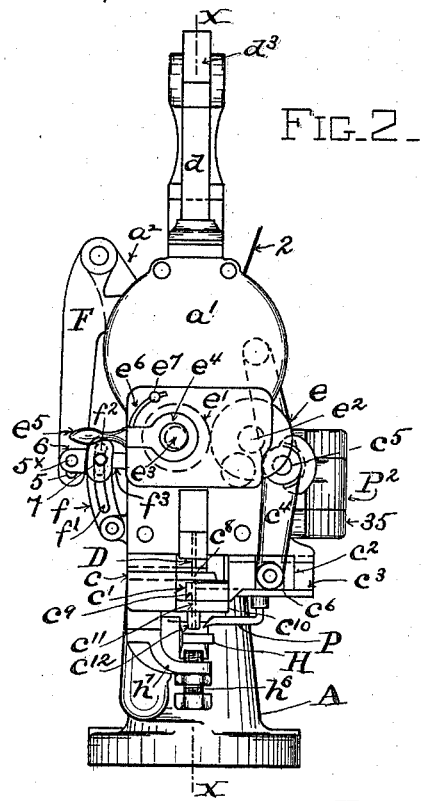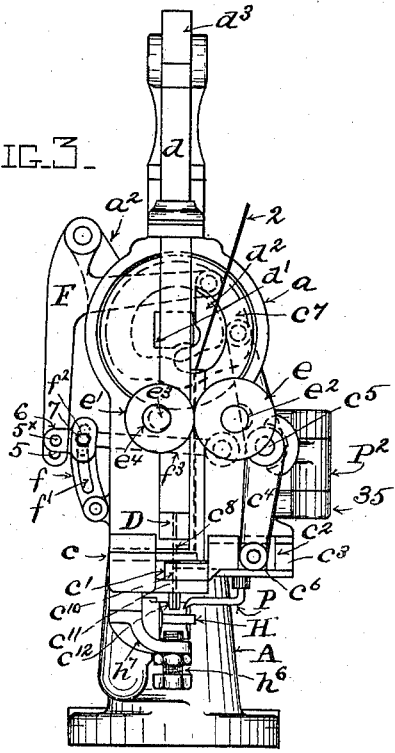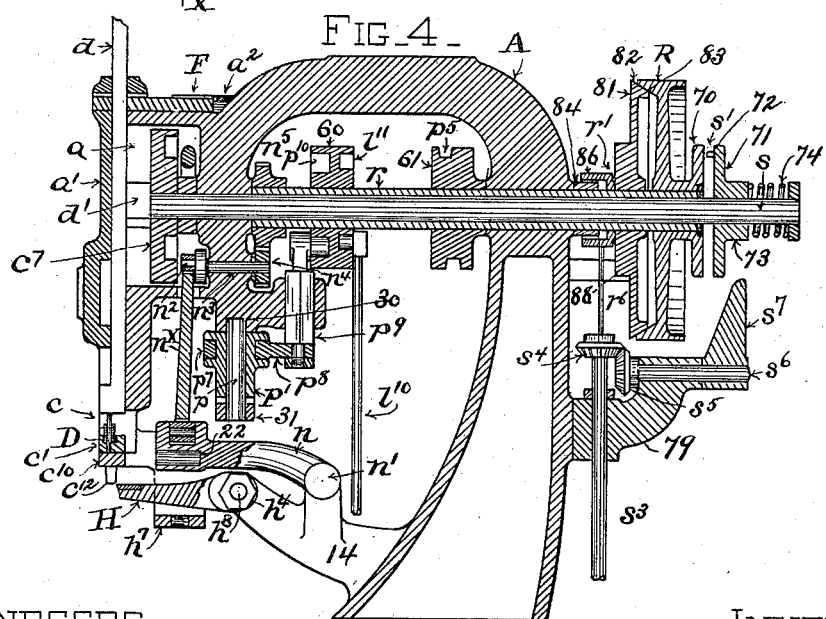

G. H. GIFFORD.
SOLE MACHINE.

No. 579,144. Patented Mar. 23, 1897.

WITNESSES
Fred V. Hart.
George E. Barstow

INVENTOR
George H. Gifford
By his Attorney
Benjamin Phillips (No Model.) 5 Sheets—Sheet 4.

G. H. GIFFORD.
SOLE MACHINE.

No. 579,144. Patented Mar. 23, 1897.

WITNESSES
Fred V. Hart.
George E. Barstow.

INVENTOR
George H. Gifford
By his Attorney
Benjamin Phillips (No Model.)   5 Sheets—Sheet 5.
G. H. GIFFORD.
SOLE MACHINE.
No. 579,144. Patented Mar. 23, 1897.
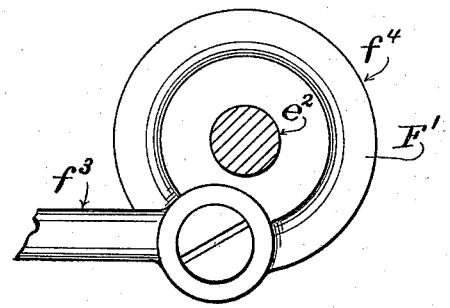
FIG. 12.
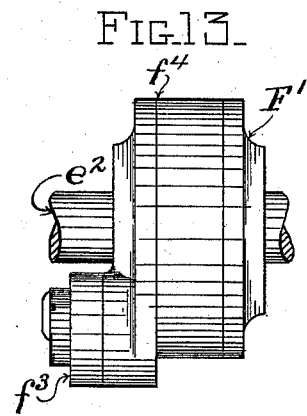
FIG. 13.
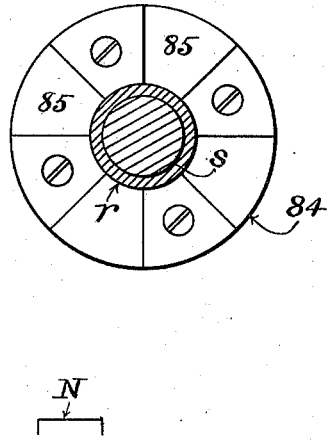
FIG. 14.
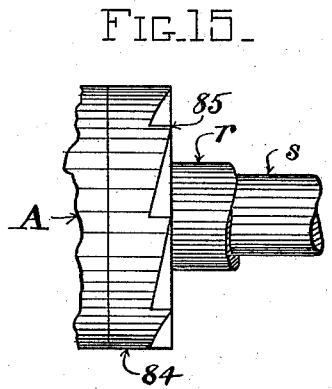
FIG. 15.
FIG. 16.
WITNESSES
Fred V. Hart.
George E. Barstow
INVENTOR
George H. Gifford
By his Attorney
Benjamin Phillips

UNITED STATES PATENT OFFICE.

GEORGE H. GIFFORD, OF BROCKTON, MASSACHUSETTS.

SOLE-MACHINE.

SPECIFICATION forming part of Letters Patent No. 579,144, dated March 23, 1897.

Application filed December 13, 1895. Serial No. 571,975. (No model.)

*To all whom it may concern:*

Be it known that I, GEORGE H. GIFFORD, a citizen of the United States, and a resident of Brockton, in the county of Plymouth and Commonwealth of Massachusetts, have invented a new and useful Improvement in Sole-Machines, of which the following, in connection with the accompanying drawings, is a specification.

The present invention relates generally to improvements in machines of the above class, and more particularly to improvements in machines for attaching the heel-seat of the sole to the lasted upper and insole and rounding or trimming the projecting edge to conform substantially to the form of the last.

To the above end the present invention consists of a tool or driver arranged to operate upon the bottom of the sole, a trimming-knife arranged to operate upon the edge portion of the sole, connected mechanisms for actuating the tool and knife, and means under the control of the operator for throwing the tool out of operation during the operation of the knife.

The present invention further consists of certain new and improved devices and combinations of devices and improvements in certain details of mechanism hereinafter more particularly set forth and claimed.

While the machine of the present specification is designed for the purpose of nailing and trimming heel-seats upon a lasted shoe and is hereinafter termed a "heel-seat nailing and trimming machine," I consider that the present invention is not limited to the specific adaptation described, as several features thereof could readily be adapted to "rough-rounding and channeling machines" and other forms of sole-machines without any departure from the present invention.

The present invention is illustrated in the accompanying drawings, in which—

Figure 5:
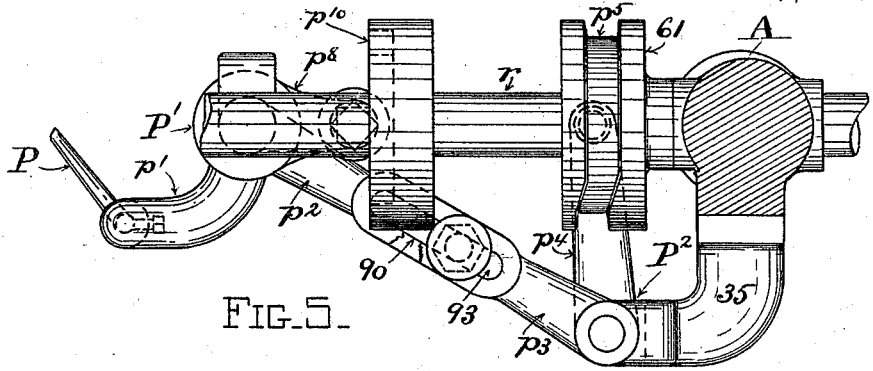
Figure 6:
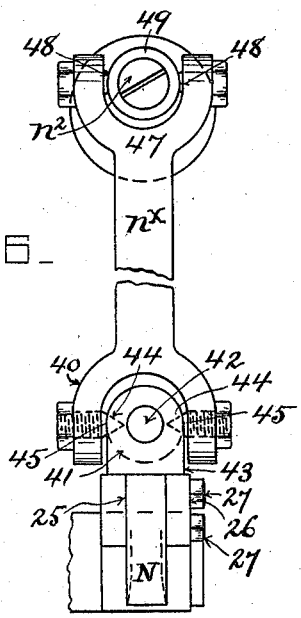
Figure 7:
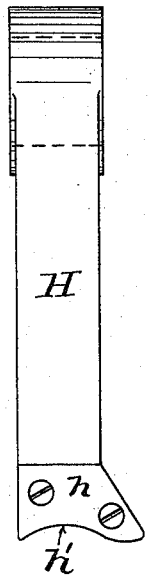
Figure 8:
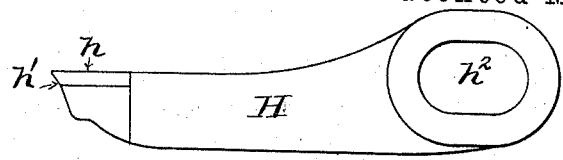
Figure 9:
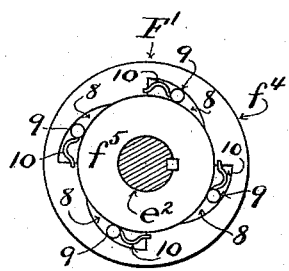
Figure 10:
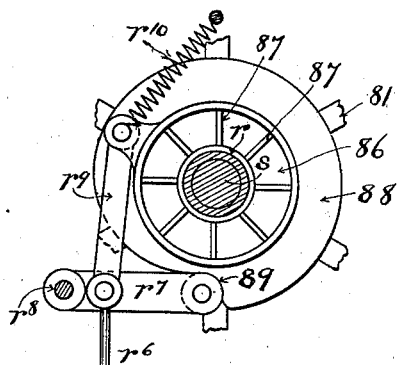
Figure 11:
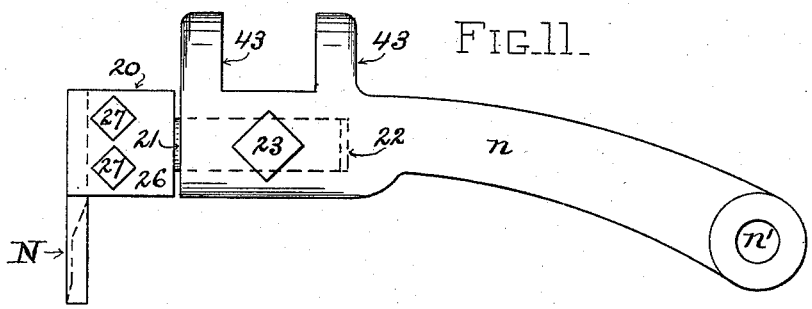

Figure 1 is a side elevation of a machine embodying the same. Fig. 2 is a front view of the head of said machine. Fig. 3 is a front view of the head of said machine with the front plate removed. Fig. 4 is a longitudinal vertical section through the head of said machine on line $xx$, Fig. 2. Fig. 5 is a top plan view, enlarged, of the feed mechanism. Fig. 6 is a front view of the trimming-knife, the knife-lever, and a portion of its actuating mechanism. Figs. 7 and 8 are respectively a top plan and side view of the work-gage and cutter-plate. Fig. 9 is a front view of frictional ratchet (portion of case removed) forming a part of wire-feeding mechanism. Fig. 10 is a detail view, partially in section and partially in front elevation, showing clutch for controlling the trimming and work-feeding mechanisms. Fig. 11 is a detail view of the trimming-knife and its lever shown in side elevation. Figs. 12 and 13 are detail views showing wire-feeding ratchet and a portion of its operating mechanism in front and side elevations. Figs. 14 and 15 are detail views showing in front and side elevations a portion of the clutch controlling the work feeding and trimming mechanisms, and Fig. 16 is an end view of trimming-knife.

Similar letters and figures of reference refer to similar parts throughout the several views.

In the drawings, A represents a frame or head suitable to support the working parts of the machine and conveniently mounted upon a suitable post or pedestal A'.

While I do not consider the present invention as limited to any specific form of nailing mechanism, since any of the well-known forms of loose nailer or continuous-wire nailer may be, with slight modifications, adapted to operate in connection with the mechanism hereinafter described and good results secured, yet in order that one skilled in the art may be able to thoroughly understand the nature of the present invention and easily construct a machine embodying the same I will now describe a form of continuous-wire nailer which I have adopted in practice and have simplified and improved.

In the drawings, D represents a driver which is secured to the driver-bar $d$, which is supported in suitable bearings on the head A, in which it is free to reciprocate vertically. The driver-bar $d$ carries a cam-block $d'$, which is engaged by a cam $d^2$, the form and arrangement of which will be more fully hereinafter described. The driver-bar $d$ is projected above the head A, its upper end being in contact with the driving-lever $d^3$ in the usual manner.

The driving-lever $d^3$ may be and conveniently is of the usual form, consisting of a substantially straight lever fulcrumed at $d^4$ upon the head A or suitable uprights thereon. The front end of lever $d^3$ rests upon the driving-bar $d$ and the opposite end upon a rod $d^5$, free to reciprocate vertically, and supported and guided in suitable bearings in the head A. A spring $d^6$ is provided, which bears against a nut or stop $d^7$ and acts to keep the rod $d^5$ in its raised position.

The above-described arrangement is such that the driver-bar $d$ is raised by the action of the cam $d^2$ raising the front end of the lever $d^3$ and depressing rod $d^5$ against the action of the spring $d^6$. The cam $d^2$ is formed with an abrupt pitch to allow the block $d'$ to drop quickly, so that sufficient momentum is given to the driver-bar $d$ and driver D by the action of the spring $d^6$ to drive the nail, which is fed into the throat $c^{12}$, as hereinafter described.

The reference-letter $c$ represents a stationary cutter suitably secured to the head A, and $c'$ represents a movable cutter arranged to coöperate with the cutter $c$ to cut the nails from the wire 2 and carried by the horizontally-reciprocating carrier $c^2$, mounted in suitable ways $c^3$ on the head A. The carrier $c^2$ may be conveniently actuated by a bent lever $c^4$, fulcrumed at $c^5$ on the head A, one arm of the lever $c^4$ being pivotally connected with a slide-block $c^6$, mounted in transverse ways upon the carrier $c^2$, and the other arm carrying a cam-roll working in path cam $c^7$, the form and arrangement of which will be hereinafter more fully described.

The cutter $c$ is conveniently provided with a perforation $c^8$ in line with the driver D, as shown by dotted lines in Figs. 2 and 3, and the cutter $c'$ with a perforation $c^9$, adjacent to its cutting edge. Below the cutter $c'$ is a stationary plate or guard $c^{10}$, preferably formed upon the head A, which is perforated at $c^{11}$ in line with the driver D and with the bore of the throat $c^{12}$.

The above-described arrangement is such that when a nail has been severed from the wire 2 by the action of the cutters it falls into the perforation $c^9$ in the cutter $c'$ and is carried by the further movement thereof along the plate $c^{10}$ until the perforations $c^8$ $c^9$ $c^{11}$ register with each other and with the bore of the throat $c^{12}$, when the driver D descends and drives the nail.

All the above-described devices in substantially the form shown are old and well-known in the art in several forms of continuous-wire nailers, and a further description thereof is regarded as unnecessary herein. I may say, however, that the cams $d^2$ and $c^7$ for actuating the driver-bar $d$ and the lever $c^4$ are conveniently inclosed in a casing $a$, through which extends the driving-bar $d$ and which is provided with a removable front plate $a'$, an arrangement which is also common in prior forms of continuous-wire nailers.

I will now describe the devices shown in the drawings for feeding the wire 2 to the cutters $c$ and $c'$, and which involve several improvements over the prior art.

The wire 2 is carried upon a reel 3, mounted in the usual manner upon the head A. From the reel 3 the wire 2 extends (preferably through suitable apertures in the casing $a$) between a pair of corrugated feed-wheels $e$ and $e'$. The feed-wheel $e$ is arranged to be positively rotated, being mounted upon and rotating with a shaft $e^2$, supported in suitable bearings in the head A and actuated as hereinafter described.

The feed-wheel $e'$, as shown, is an idler and is arranged to be moved laterally toward and away from the feed-wheel $e$ to regulate the pressure of the feed-wheels upon the wire. While I am aware that it has been heretofore proposed to provide in a continuous-wire nailer a pair of corrugated feed-wheels, one of which is laterally movable to regulate the pressure upon the wire, I consider, nevertheless, that I have invented a new mechanism for securing the above-suggested lateral movement of the feed-wheel, which I will now describe.

The wheel $e'$ is mounted upon a trunnion $e^3$, eccentrically projected from a hub $e^4$, mounted and free to rotate in suitable bearings in the removable front plate $a'$, the above-described arrangement being such that a rotation of the hub $e^4$ in one direction moves the trunnion $e^3$ and wheel $e'$, mounted thereon, toward the wheel $e$, and a rotation of the hub $e^4$ in an opposite direction moves the wheel $e'$ away from the wheel $e$. In practice I provide the hub $e^4$ with an operating-lever $e^5$, to which is conveniently secured a segmental rod $e^6$, which is projected through a clamp $e^7$, by means of which the lever $e^5$ may be locked in any desired position.

The advantage which I claim for the above-described construction over the prior art is its extreme simplicity and the ease, accuracy, and rapidity of its operation.

The feed-wheel $e$ is actuated by the following-described mechanism: Fulcrumed upon the head A, or a suitable bracket $a^2$ secured thereon, is a bent lever F, one arm of which carries a cam-roll working in the path-cam $c^7$, and the other arm is pivotally secured to a swinging link $f$, also fulcrumed upon the head A. Provision is made for the relative movement of the lever F and link $f$ by a slot 5 in the lever F, which receives a pin $5^\times$ upon the link $f$, or a projection 6 therefrom. In the link $f$ is provided a circular adjustment-way $f'$, in which works a slide $f^2$, movable along the same, and which may be clamped in any desired position therein by a nut 7 or other suitable clamping means. The slide $f^2$ is connected by the pivoted connecting-rod $f^3$ with the outer casing of the frictional ratchet F', which is mounted upon and rotates with the shaft $e^2$.

As shown in the drawings, the ratchet F', Fig. 9, comprises an annular casing $f^4$, surrounding and fitted to a central block or disk $f^5$ and free to turn thereon. In the annular casing $f^4$ are formed a series of inclined recesses 8 8 8 8, &c., in each of which works a roll 9, which is acted upon by a spring 10, which acts to force it toward the contracted portion of the recess 8. The above-described arrangement is such that a rotation of the casing $f^4$ in one direction pinches the rolls 9 9, &c., between the casing $f^4$ and disk $f^5$ and causes the disk $f^5$ to rotate with the casing $f^4$, while when the casing $f^4$ is rotated in an opposite direction it turns freely over the disk $f^5$, which does not rotate therewith.

The operation of my improved wire-feeding mechanism is described as follows: The rotation of the cam $c^7$ imparts a swinging motion to the lever F, which in turn imparts a swinging motion to the link $f$, which by means of the connecting-rod $f^3$ imparts an oscillatory motion to the casing $f^4$ of the ratchet F'. When moved in one direction, the casing $f^4$ carries with it the disk $f^5$ and causes a partial rotation of the shaft $e^2$, which is communicated to the feed-wheel $e$, mounted thereon, causing the wire 2 to be advanced toward the cutters $c$ and $c'$ between the feed-wheels $e$ and $e'$. When the casing $f^4$ is moved in an opposite direction, as above stated, it moves loosely over the disk $f^5$, so that a reverse movement of the ratchet produces no rotation of the shaft $e^2$ or wheel $e$, and consequently no movement of the wire 2. The extent of the movement of the wire 2 at each oscillation of the casing $f^4$, and consequently the length of the nail formed by the machine, is readily regulated by moving the slide $f^2$ along the slideway $f'$ in the lever $f$ and clamping it in the required position to give the desired length of nail. I may say in this connection that while I do not claim to be the inventor of a frictional ratchet, yet I have so combined the same with the devices hereinbefore described in this specification and hereinafter designated in the claims that I secure thereby a series of positive movements of the feed-wheel of uniform extent without the complicated devices shown in the prior art to prevent lost motion, and I further provide a simple and convenient adjusting device whereby the extent of the movement of the feed-wheel may be regulated.

I will now describe in detail the form of trimming mechanism shown in the drawings.

H represents a cutter-plate, the function of which is to support the edge of the heel-seat under the action of the trimming-knife, and which may be provided with the usual throat to receive the knife, or with a cutter-block $h$, of soft metal or other suitable material, which will not dull the knife.

$h'$ represents the work-gage, which, as shown in the drawings, forms the outer end of the cutter-plate H, being rigidly secured to or made integral with the cutter-plate. A preferred form of the gage $h'$ is shown in Figs. 7 and 8, but in regard to the same it is only necessary to say that the gage $h'$ is so formed and held in such position that it will bear upon the lasted upper against the counter and guide the shoe while being turned to pass the gage around the back of the last to insure the proper presentation of the heel-seat to the nailing and trimming devices. The gage $h'$ may be supported otherwise than by the cutter-plate H.

It will be noted that, as shown in the drawings, the gage $h'$, by bearing against the lasted upper, holds the cutter-plate H in position under the edge of the sole, not allowing it to extend too far under the heel-seat (which before the operation of the machine is not attached to the shoe) and preventing it also from being withdrawn from under the edge in passing around the back of the heel-seat. In this connection I desire to say that I am aware of the several forms of gages or guides used upon sole-sewing and rough-rounding and channeling machines, but such machines as heretofore constructed do not operate upon the heel-seat of a sole, nor are the gages or guides thereon adapted to guide the shoe while being turned upon its support to present the heel-seat to the operating-tools.

The cutter-plate H may be, and conveniently is, adjustable transversely to the direction of the feed, a result which I secure in the form of my invention shown in the drawings by the following device. In the cutter-plate H is formed an elongated bolt-hole $h^2$, through which extends a bolt $h^3$, projected through suitable bearings in the head A or a bracket 14, projected therefrom. The outer portion of the bolt $h^3$ is threaded and is provided with a nut $h^4$, the arrangement being such that by loosening the nut $h^4$ the plate H may be moved in or out, and by setting up the nut $h^4$ the plate H may be clamped in any desired position. The function of the above-described adjustment is to determine the width of the edge left by the trimming device around the heel-seat.

In practice I find it convenient to provide for a vertical adjustment of the plate H to allow for soles of different thickness, a result which in the form of my invention shown in the drawings I secure as follows: The plate H rests upon a threaded bolt $h^6$, which is supported in a correspondingly-threaded bearing in a bracket $h^7$, dependent from the head A, the arrangement being such that by loosening nut $h^4$ the outer end of the plate H, which receives the work, may be set at any desired height by means of the bolt $h^6$.

During the operation of the nailing and trimming devices the projecting edge of the heel-seat rests upon the cutter-plate H, and the shoe itself may be held by the operator, as during the operation of a sole-sewing machine. I prefer, however, to provide a suitable support therefor, which in the form shown in the drawings is described as follows:

L represents a suitable post or standard provided at its upper end with the usual spindle $l$, which is inserted in the spindle-hole in the last. The post L is connected by a universal joint $l'$ with the supporting-standard $l^2$, which is mounted and free to reciprocate in a suitable socket or sleeve $l^3$, supported by suitable supports projected from the pedestal A'. The standard $l^2$ is elastically supported in the sleeve $l^3$ conveniently as follows: In the base of standard $l^2$ is formed a socket $l^4$, which receives the spring $l^5$, which is supported by a plate $l^6$, secured to the sleeve $l^3$. The standard $l^2$ is preferably polygonal in section to prevent rotation.

The above-described arrangement is such that the spindle $l$ may be inserted into the spindle-hole of the last carrying the shoe to be operated upon, and the post L and standard $l^2$ depressed against the action of spring $l^5$, and the last swung into position to bring the projecting edge of the heel-seat upon the cutter-plate H, when the post L is allowed to rise, and the sole of the shoe is firmly held by the action of the spring $l^5$ against the throat $c^{12}$.

To prevent the displacement of the shoe by the action of the driver D, I have provided a device whereby the standard $l^2$ is locked in its raised position, as above described, while the driver D is driving a nail, and released after the nail is driven to permit the operation of the feed.

A convenient form of the above-suggested device is described as follows: In a suitable guideway in the pedestal A', preferably in the supports of sleeve $l^3$, works a sliding block $l^7$, fitted to an aperture in sleeve $l^3$, and arranged to bear against the standard $l^2$. To the block $l^7$ is pivoted one arm of the toggle-lever $l^8$, the other arm of which is pivoted at $l^7$ to the pedestal A'. The toggle $l^8$ is operated by a connecting-rod $l^{10}$, free to reciprocate vertically in suitable bearings in brackets (omitted for the sake of clearness) on the head A and pedestal A', and which carries near its upper end a cam-roll which works in the path-cam $l^{11}$. The cam $l^{11}$ is so formed and timed with reference to the other parts of the machine that it operates, through the connecting-rod $l^{10}$, to straighten the toggle $l^8$ and advance the block $l^7$ to pinch the standard $l^2$ and hold it firmly from vertical movement while the driver D drives each nail. After each nail has been driven the cam $l^{11}$ bends the toggle $l^8$ and withdraws the block $l^7$ to release the standard $l^2$, leaving the post L free to be depressed against the action of the spring $l^6$. The rod $l^{10}$ is in practice provided with a draw-joint and spring $l^{22}$ to take up any excess of movement imparted thereto by the cam $l^{11}$.

I will now describe a preferred, though by no means essential, form of trimming-knife and its actuating mechanism.

N represents the trimming-knife, which may be of any suitable form, but which is preferably formed with a cutting edge, having a substantially straight central portion and inwardly-bent ends, substantially as shown in Fig. 10.

I prefer the form of knife above suggested for the reason that it insures a smooth cut, but the present invention is by no means limited thereto.

The trimming-knife N is secured to the trimming-knife lever $n$, conveniently pivoted at $n'$ to the head A or a suitable bracket thereon. In practice I find it convenient to mount the knife N in a carrier 20, from which projects a rod 21, which is fitted to a longitudinal socket 22 in the lever $n$ and movable along the same, being held in the desired position by means of a set-screw 23, or otherwise so to arrange the knife N that it is adjustable transversely to the feed. I also find it convenient to arrange for a vertical adjustment of the knife in the carrier 20, which I secure as follows: In the front of the carrier 20 is formed a vertical groove 25, one of the side walls of which is formed by a movable plate 26, which is secured to the carrier 20 by means of the bolts 27 27. The groove 25 receives the knife N, which is movable along the same, and may be clamped in any desired position by setting up the bolts 27 27. I may say in this connection that by arranging both the cutter-plate H and the knife N to be adjustable transversely to the feed I can regulate the width of the edge left around the heel-seat and the position of the nails with reference to the edge, a feature of considerable importance in machines of this class. The trimming-knife lever $n$ is arranged to oscillate vertically conveniently by the following mechanism: $n^\times$ represents a connecting-rod which connects the knife-lever $n$ with a crank or eccentric pin $n^2$, carried by a shaft $n^3$, mounted and free to rotate in suitable bearings in the head A, and driven by a gear $n^4$, which meshes with a gear $n^5$, mounted and actuated as hereinafter described, the arrangement being such that a rotation of gear $n^5$ through the gear $n^4$, the shaft $n^3$, the crank $n^2$, and the connecting-rod $n^\times$ produces a vertical oscillation of the knife-lever $n$.

It will be noted that the plane of rotation of the crank $n^2$ and the plane of oscillation of the knife-lever $n$ are substantially at right angles to each other, and in practice I arrange for said movements as follows: The lower end of the connecting-rod $n^\times$ is provided with a yoke 40, which embraces a sleeve or collar 41, mounted and free to rotate upon a pin 42, extending longitudinally along the lever $n$ and supported in the lugs 43 43 thereon. (See Figs. 6 and 11.) On opposite sides of the sleeve 41 are formed the sockets 44 44, which are engaged by the pins 45 45 upon the yoke 40. Each of the pins 45 45 is threaded to engage a threaded bearing in the yoke 40, so that the pins 45 45 can be adjusted in the sockets 44 44. The upper end of connecting-rod $n^\times$ carries a similar yoke 47, similarly connected by the pins 48 48 with a collar or sleeve 49 upon the crank-pin $n^2$.

While I do not consider a feed mechanism as essential to the successful operation of the other features of my invention, I find in practice that more uniform results can be secured therewith and the operation of the machine is made easier for the operator. I will therefore describe a preferred form of feed mechanism and explain its connection with other parts of the machine.

In the drawings, P represents a feed-awl which is mounted upon a feed-lever P', which is supported upon a trunnion $p$, the upper end of which is fitted to a socket 30 in the head A (see Fig. 4) and the lower end of which is held by a pin (not shown) or other suitable means in the horizontal arm of an angle-piece 31, dependent from the head A. The feed-lever P' is free to rotate about and reciprocate vertically along the trunnion $p$. The feed-lever P' is conveniently a bent or angle lever, one arm $p'$ of which carries the feed-awl P, the other arm $p^2$ being connected by suitable connections with the arm $p^3$ of the bent lever P², pivotally supported at its angle in the bracket 35 on the head A or other suitable support. The arm $p^4$ of the bent lever P² carries a cam-roll working in the path-cam $p^5$, the arrangement being such that a rotation of the cam $p^5$ produces a swinging movement of the lever P², which produces a swinging movement of the feed-lever P', moving the awl P to and fro in a horizontal plane.

On that portion of the feed-lever P' which surrounds the trunnion $p$ is formed an annular groove, to which is fitted a collar $p^7$, upon which is formed a lug or arm $p^8$, which projects horizontally therefrom and which is rigidly secured to a vertically-reciprocating bar $p^9$, mounted in suitable bearings in the head A. (See Fig. 4.) The bar $p^9$ carries a cam-roll working in a path-cam $p^{10}$, and the above-described arrangement is such that a rotation of cam $p^{10}$ causes a vertical reciprocation of the bar $p^9$ and a corresponding movement of the lever P' along the trunnion $p$, producing a vertical movement of the feed-awl P. The united action of cams $p^5$ and $p^{10}$ imparts to the awl P the movement of a four-motion feed.

The length of the horizontal or feeding movement of the awl may be conveniently rendered adjustable as follows: In the arm $p^2$ of the lever P' is formed an adjustment-slot 90, to which is fitted a slide 91, movable along the same. The slide 91 carries a pin 92, which extends through a slot 93 in the arm $p^3$ of the lever P². Clamping means 94 are provided, whereby the slide 91 may be clamped in any desired position along the slot 90. The pin 92 is movable along the slot 93 to allow for the relative movement of the levers P' and P². The cams $p^{10}$ and $l^{11}$ may be and conveniently are path-cams and formed upon opposite faces of the disk 60. The cam $p^5$ is conveniently a periphery cam formed upon a disk 61.

In operating a heel-seat nailing and trimming machine it is often required to trim the heel-seat farther toward the toe than is necessary or proper to extend the row of nails which secure it to the insole. For this reason I have found it convenient to so arrange my nailing and trimming devices that they may be controlled independently of each other, a result which in the form of my invention shown in the drawings I secure as follows: The cams $c^7$ and $d^2$, which actuate the nail-driving and wire feeding and cutting mechanisms, are both mounted upon and rotate with a shaft $s$, provided with suitable bearings in the head A. The gear $n^5$, which oscillates the trimming-knife N, the disk 60, upon which are formed the cams $p^{10}$ and $l^{11}$, which, respectively, impart the vertical movement to the feed-awl P and actuate the toggle $l^8$ to pinch and release the standard $l^2$, and the disk 61, on which is formed the cam $p^5$, which imparts the horizontal movement to the feed-awl P, are all mounted upon and rotate with the shaft $r$. As shown in the drawings, the shaft $r$ is tubular and surrounds the shaft $s$, which extends through the same. The shafts $r$ and $s$ are free to rotate independently of each other.

The shafts $r$ and $s$ may be and conveniently are driven by a common pulley R, which is mounted to turn loosely upon the outer shaft $r$ and held from movement along the same by suitable collars (not shown) or other suitable means.

The shaft $s$ may be connected with the pulley R to rotate therewith by means of a clutch $s'$, and the shaft $r$ similarly connected by means of an independent clutch $r'$.

The clutch $s'$ may be of any suitable form, that shown in the drawings being of a well-known type, consisting of a disk 70, secured to the hub of the pulley R and having in its face a segmental slot (not shown) and a disk 71, secured to a sleeve 73, splined to the shaft $s$ and free to slide along the same, the disk 71 carrying upon its face a pin 72 in position to engage the slot in the disk 70. A spring 74 is arranged to hold the members of the clutch $s'$ in engagement.

The clutch $s'$ may be conveniently controlled by the following mechanism: Fulcrumed at 75 on the pedestal A', or a suitable bracket 76 thereon, is a laterally-swinging lever $s^2$, conveniently in position to be operated by the knee of the operator. The lever $s^2$ is connected to and rotates with a connecting-rod $s^3$, mounted in suitable bearings on the pedestal A' and head A. At or near its upper end the rod $s^3$ carries a gear $s^4$, which meshes with a gear $s^5$ on a short shaft $s^6$, mounted in suitable bearings in a bracket 79 on the head A or other suitable support. From the shaft $s^6$ is projected an arm $s^7$, the upper end of which is wedge-shaped and projects in the path of a stud $s^8$ on the sleeve 73.

The above-described arrangement is such that as the sleeve 73 rotates the stud $s^3$, coming in contact with the wedge-shaped portion of the arm $s^7$, forces the sleeve 73 outward, disengaging the members of the clutch $s'$. An outward motion of the lever $s^2$ by means of rod $s^3$ and gears $s^4$ and $s^5$ rotates the shaft $s^6$ and tips the arm $s^7$ out of the path of the stud $s^8$, and the members of the clutch $s'$ are thrown into engagement by the action of spring 74. A suitably-placed spring 80 is provided, connected with the lever $s^2$ and pedestal A', which acts to keep the arm $s^7$ in the path of the stud $s^8$. The clutch $r'$ may also be of any suitable construction. As shown in the drawings, it consists of a disk 81, splined to the shaft $r$ and movable along the same. The disk 81 has an inclined peripheral face 82, which engages a correspondingly-inclined portion 83 of the pulley R.

The reference-numeral 84 represents a sleeve which surrounds the shaft $r$ and is secured to the head A in such manner that it does not rotate with the shaft $r$ and is held from motion along the same. On the end of the sleeve 84 are formed a series of inclined projections or wedges 85. (See Figs. 14 and 15.) Between the sleeve 84 and the disk 81 is interposed a disk 86, mounted upon and capable of rotation independently of the shaft $r$. The disk 86 is provided with a series of radial ribs or projections 87, (see Fig. 10,) which are adapted to come in contact with the inclined projections 85 upon the sleeve 84, the above-described arrangement being such that a rotation of the disk 86 in one direction, by moving the radial ribs 87 over the inclined projections or wedges 85, forces the disk 86 against the disk 81 and moves the disk 81 toward the pulley R, causing the inclined face 82 to engage the inclined portion 83 of the pulley R in such manner that the disk 81 is frictionally held to rotate with the pulley R, causing a rotation of the shaft $r$. When the disk 86 is rotated in an opposite direction, the ribs 87, being carried into the depressions in the end of sleeve 84, allow the disks 86 and 81 to move away from the pulley R and the inclined face 82 to disengage itself from the inclined portion 83 of the pulley R. In practice I form the peripheral face 82 of the disk 81 at such an angle to its axis that when the disk 81 is released it will immediately disengage itself from pulley R.

The clutch $r'$ may be conveniently controlled by the following mechanism: $r^3$ represents a treadle fulcrumed at $r^4$ and connected with a lever $r^5$, which is connected by a pivoted connecting-rod $r^6$ with a swinging lever $r^7$, fulcrumed at $r^8$ on the head A. The lever $r^7$ is connected by a link $r^9$ with the periphery of the disk 86. The above-described arrangement is such that a depression of the treadle $r^3$, by means of the lever $r^5$ and the connecting-rod $r^6$, depresses the lever $r^7$, and by means of the link $r^9$ rotates the disk 86 to engage the members of clutch $r'$. A suitably-placed spring $r^{10}$ rotates the disk 86 in an opposite direction to disengage the clutch $r$. To the disk 81 is secured a cam 88, which, when the lever $r^7$ is raised by the action of the spring $r^{10}$, comes in contact with the roll 89, carried by the lever $r^7$, and acts as a brake to prevent further rotation of the shaft $r$. Any other suitable form of brake may, however, be substituted therefor.

The operation of the several parts of my present invention has been fully described in connection with the description of their form and arrangement.

In using a machine embodying the present invention, as shown in the drawings, the operator jacks the shoe on post L by inserting the spindle $l$ in the spindle-hole of the last. The operator then depresses the post L and brings the shoe under the throat $c^{12}$ with the projecting edge of the heel-seat over the cutter-block H and the gage $h'$ bearing against the counter. He then allows the post L to rise, which clamps the sole against the throat $c^{12}$. I may say in this connection that the machine of the drawings is designed to follow the "rough-rounder," so called, which trims the fore part of the sole and a portion of the shank, commonly leaving the heel-seat and a small portion of shank adjacent thereto untrimmed. For the reason above stated the operation of the present machine commonly commences a little forward of the heel-seat at a point at which it is undesirable to drive nails, and the operator, when he has adjusted the shoe upon the machine as above stated, depresses the treadle $r^3$, which engages the members of clutch $r'$ and (power being applied to pulley R) sets in rotation the shaft $r$, which, as before stated, actuates the work feeding and trimming devices, and those devices are set in operation. The operator supports the fore part of the shoe and holds the shoe against the gage $h'$, turning it as required to allow the feed-awl P to present the edge to the trimming-knife N, the nailing mechanisms remaining at rest. When a point upon the heel-seat has been reached at which it is desirable to commence to drive nails, the operator swings out the lever $s^2$ with his knee and engages the members of the clutch $s'$, which, as before stated, sets in rotation the shaft $s$, which actuates the wire feeding and cutting and the driving mechanisms, and said mechanisms are set in operation and commence to drive a row of nails around the heel-seat, which nails are spaced by the length of the feed, that is, each nail is driven at a distance from the next preceding nail substantially equal to the length of the horizontal movement of the feed-awl P. While holding out the lever $s^2$ with his knee the operator still keeps his foot upon the treadle $r^3$, holding the same in its depressed position, so that the nailing and trimming devices are kept in simultaneous operation.

While the nailing and trimming devices are both in operation, as above described, the operator holds the shoe against the gage $h'$ and turns the same as required, allowing it to be carried along by the feed until the back of the heel has been turned and a point reached upon the opposite side of the sole at which it is desirable to end the row of nails driven by the nailing mechanism. When the point above described is reached, the operator withdraws his knee and allows the lever $s^2$ to be swung in by the action of the spring 80, which brings the arm $s^7$ in the path of the stud $s^8$, disengaging the members of the clutch $s'$ and stopping the rotation of shaft $s$ and of the nailing mechanisms actuated thereby. If necessary, the operator still holds the treadle $r^3$ in a depressed position and the work feeding and trimming mechanisms continue in operation until a point is reached (where the rough-rounding machine left off) beyond which it is unnecessary to trim the sole, when the operator releases the treadle and the operation of all the operating devices ceases, and the shoe is removed and another adjusted.

Having thus described the form and arrangement of the several features of my invention and the method of their individual and united operation, I desire to say that I do not consider the present invention as limited to the details of mechanism herein shown; but

I claim as novel and desire to secure by Letters Patent of the United States—

1. In a machine for operating upon the soles of boots and shoes the combination of a nailing device, a trimming device, connected mechanisms for actuating the nailing and trimming devices, and means for independently actuating the trimming device, substantially is described.

2. In a machine for operating upon the soles of boots and shoes the combination of a nailing device, a trimming device, connected mechanisms for actuating the nailing and trimming devices, and a gage formed and held in position to bear upon the lasted upper against the counter and to guide the shoe to the nailing and trimming devices while being turned to pass the gage around the back of the last, substantially as described.

3. In a machine for operating upon the soles of boots and shoes the combination of a movable trimming-knife for operating upon the edge portion of the sole, a movable tool for operating upon the bottom of the sole, connected mechanisms for actuating the knife and tool, and means controlled by the operator for throwing the tool out of operation during the operation of the knife, substantially as described.

4. In a machine for operating upon the soles of boots and shoes the combination of a nailing device, a trimming device, a work-feeding device, connected mechanisms for operating the nailing, trimming and work-feeding devices, and means for operating the trimming and work-feeding devices independently of the nailing device, substantially as described.

5. In a machine for operating upon the soles of boots and shoes the combination of a nailing device, a trimming device, a work-feeding device, connected mechanisms for actuating the nailing, trimming, and work-feeding devices, and means controlled by the operator for stopping the operation of the nailing device during the operation of the trimming and work-feeding devices, substantially as described.

6. In a machine for operating upon the soles of boots and shoes the combination of a nailing device, a vibrating trimming device, mechanism for actuating said devices, and work-feeding mechanism timed and arranged to present the edge of the sole to the trimming device and to space the nails driven by the nailing device, substantially as described.

7. In a machine for operating upon the soles of boots and shoes the combination of a tool for operating upon the bottom of the sole, a trimming-knife for operating upon the edge portion of the sole, a shaft and suitable connections for actuating the tool, a shaft and suitable connections for actuating the knife, suitable clutches connecting said shafts with a common driving mechanism, said driving mechanism, and means for controlling the clutches, substantially as described.

8. In a machine for operating upon the soles of boots and shoes the combination of a tool for operating upon the bottom of the sole, a trimming-knife for operating upon the edge portion of the sole, independent operating mechanisms connected respectively with the tool and knife, actuating means common to both operating mechanisms, and means under the control of the operator for connecting one or both operating mechanisms with the common actuating means to secure a joint operation of the knife and tool, and a separate operation of the knife, substantially as described.

9. In a machine for operating upon the soles of boots and shoes, the combination with suitable wire cutting and driving mechanisms, of a pair of feed-rolls for feeding the wire to the wire-cutting mechanisms, and mechanism for actuating one of said rolls, comprising a shaft upon which the roll is mounted, a disk fixed upon said shaft, a casing movable independently of the disk and arranged to frictionally engage the same, a positively-actuated swinging lever, and a connecting-rod pivotally and adjustably connected with the swinging lever, substantially as described.

10. In a machine for operating upon the soles of boots and shoes the combination of a tool for working upon the bottom of the sole, a trimming-knife for working upon the edge portion of the sole, a shaft and tubular shaft inclosing the same, suitable connections between the shaft and tool, suitable connections between the tubular shaft and trimming-knife, means for rotating the tubular shaft independently of its inclosed shaft, and means for rotating both shafts together, substantially as described.

11. In a machine for operating upon the soles of boots and shoes the combination, with a suitable nailing mechanism, of a trimming-knife, a work-gage, and means for adjusting both the work-gage and knife transversely to the direction of the travel of the work, substantially as described.

12. In a machine for operating upon the soles of boots and shoes the combination, with a suitable nailing mechanism, of a work-gage and trimming-knife both adjustable transversely to the direction of the travel of the work, and means for vertically adjusting the work-gage, substantially as described.

13. In a machine for operating upon the soles of boots and shoes the combination, with a trimming-knife, of a cutter-plate movable vertically and transversely to the direction of the travel of the work, an adjustable stop for limiting the downward movement of the cutter-plate, and clamping means for holding the cutter-plate from motion transversely to the direction of the travel of the work, substantially as described.

14. In a machine for operating upon the soles of boots and shoes, the combination, with a nailing device for operating upon the bottom of the sole, of a trimming-knife for operating upon the edge portion of the sole, an oscillating lever carrying the trimming-knife, and connected mechanisms for actuating the lever and nailing device, substantially as described.

15. In a machine for operating upon the soles of boots and shoes, the combination of a nailing device acting upon the bottom of the sole, a vibrating trimming-knife operating upon the edge of the sole, connected mechanisms for actuating the nailing device and knife, and means for interrupting the operation of the nailing device during the continued operation of the knife, substantially as described.

16. In a machine for operating upon the soles of boots and shoes the combination, with associated parts of a nailing device, of a reciprocating driver, a trimming device, a work-feeding device, a single actuating means and suitable connecting mechanisms for reciprocating the driver and actuating the work-feeding device, and means for interrupting the reciprocation of the driver during a continued operation of the work-feeding device by said actuating means, substantially as described.

17. In a machine for operating upon the soles of boots and shoes the combination, with a nailing device and a trimming device, of connected mechanisms for positively actuating said devices, and means for interrupting the action of the nailing device, permitting a continued operation of the trimming device by said connected mechanisms, substantially as described.

In testimony whereof I have hereunto set my hand, in the presence of two witnesses, this 12th day of December, 1895.

GEORGE H. GIFFORD.

Witnesses:
A. E. WHYTE,
BENJAMIN PHILLIPS.